United States Patent
Kim et al.

(10) Patent No.: US 11,653,098 B2
(45) Date of Patent: *May 16, 2023

(54) IMAGE PROCESSING METHOD AND APPARATUS

(71) Applicants: Samsung Electronics Co., Ltd., Suwon-si (KR); Korea University Research and Business Foundation, Seoul (KR)

(72) Inventors: Jong Ok Kim, Seoul (KR); Jun Sang Yoo, Seoul (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/666,063

(22) Filed: Feb. 7, 2022

(65) Prior Publication Data

US 2022/0159165 A1 May 19, 2022

Related U.S. Application Data

(63) Continuation of application No. 16/860,385, filed on Apr. 28, 2020, now Pat. No. 11,245,856.

(30) Foreign Application Priority Data

May 24, 2019 (KR) .................. 10-2019-0060985

(51) Int. Cl.
*H04N 5/235* (2006.01)
*G06T 5/00* (2006.01)
*H04N 5/378* (2011.01)

(52) U.S. Cl.
CPC ......... *H04N 5/2351* (2013.01); *H04N 5/2354* (2013.01); *H04N 5/378* (2013.01)

(58) Field of Classification Search
None
See application file for complete search history.

(56) References Cited

U.S. PATENT DOCUMENTS 6,865,293 B2    3/2005  Sobol et al.
6,931,152 B2    8/2005  Spitzer
(Continued)

FOREIGN PATENT DOCUMENTS

JP      7-131815 A      5/1995
KR      10-0311075 B1   11/2001
KR      10-0482790 B1   4/2005

OTHER PUBLICATIONS

Drew, Mark S., "Optimization Approach to Dichromatic Images", *Journal of Mathematical Imaging and Vision*, vol. 3, No. 2, Jun. 1, 1993, (pp. 187-203).

(Continued)

*Primary Examiner* — Mark T Monk
(74) *Attorney, Agent, or Firm* — NSIP Law

(57) ABSTRACT

Disclosed is an image processing method and apparatus. The image processing method includes receiving an image including frames captured over time in a light environment including an alternating current (AC) light, extracting AC pixels corresponding to the AC light from pixels in the image, estimating visual spaces of the AC pixels based on values of the AC pixels in the frames, estimating information of the AC light included in the image based on the visual spaces, and processing the image based on the information of the AC light.

34 Claims, 11 Drawing Sheets

(56) References Cited

U.S. PATENT DOCUMENTS

| | | | |
|---|---|---|---|
| 7,313,273 | B2 | 12/2007 | Hu |
| 7,817,870 | B2 | 10/2010 | Rising et al. |
| 8,928,775 | B2 | 1/2015 | Lee |
| 11,245,856 | B2 * | 2/2022 | Kim ............ H04N 5/2354 |
| 2003/0095704 | A1 | 5/2003 | Risson |
| 2004/0135992 | A1 | 7/2004 | Munro |
| 2009/0046928 | A1 | 2/2009 | Kwak et al. |
| 2011/0268350 | A1 | 11/2011 | Tsukada |
| 2012/0200732 | A1 | 8/2012 | Takeuchi |
| 2013/0071018 | A1 | 3/2013 | Kobiki et al. |
| 2015/0085158 | A1 | 3/2015 | Kim et al. |
| 2017/0352137 | A1 | 12/2017 | Van Der Vleuten et al. |
| 2019/0019311 | A1 | 1/2019 | Hu et al. |

OTHER PUBLICATIONS

Finlayson, Graham D et al., "Solving for Colour Constancy using a Constrained Dichromatic Reflection Model", *International Journal of Computer Vision*, May 1, 2001 (pp. 127-144).

Lehmann, Thomas M. et al., "Color line search for illuminant estimation in real-world scenes",. *JOSA A*, vol. 18, No. 11, 2001 (pp. 2679-2691).

Finlayson, Graham D. et al., "Convex and Non-convex Illuminant Constraints for Dichromatic Colour Constancy", *Proceedings 2001 IEEE Conference on Computer Vision and Pattern Recognition, CVPR 2001*, vol. 1, Dec. 8, 2001, (pp. 598-604).

Tan, Robby T. et al., "Color constancy through inverse-intensity chromaticity space", *JOSA A*, vol. 21, No. 3, 2004 (pp. 321-334).

Woo, Sung-Min et al., "Improving Color Constancy in an Ambient Light Environment Using the Phong Reflection Model", IEEE Transactions On Image Processing, vol. 27, No. 4, Apr. 2018 (pp. 1862-1877).

Yoo, Jun-Sang et al., "Dichromatic Model Based Temporal Color Constancy for AC Light Sources", 2019 IEEE/CVF Conference on Computer Vision and Pattern Recognition (CVPR), 2019 (10 pages in English).

Extended European Search Report dated Sep. 7, 2020 in counterpart European Application No. 20174204.6 (10 pages in English).

\* cited by examiner

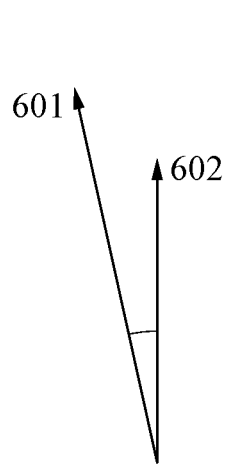
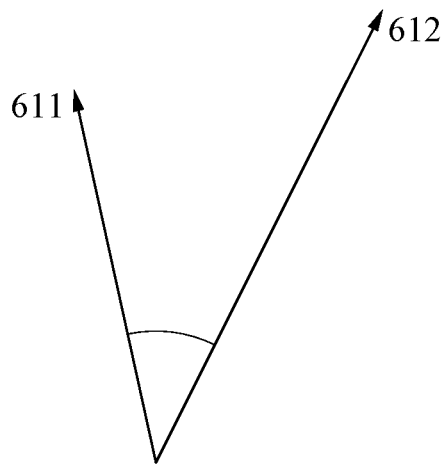
FIG. 6A　　　　　　　　FIG. 6B
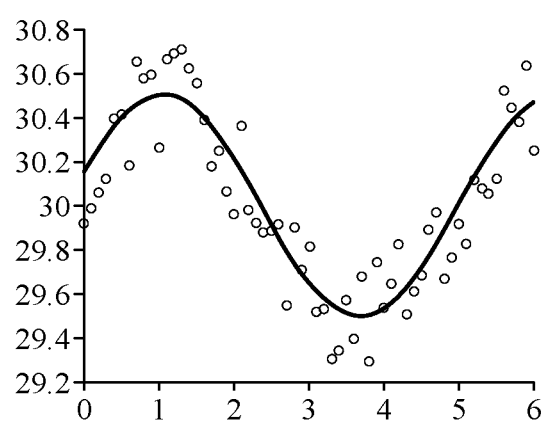
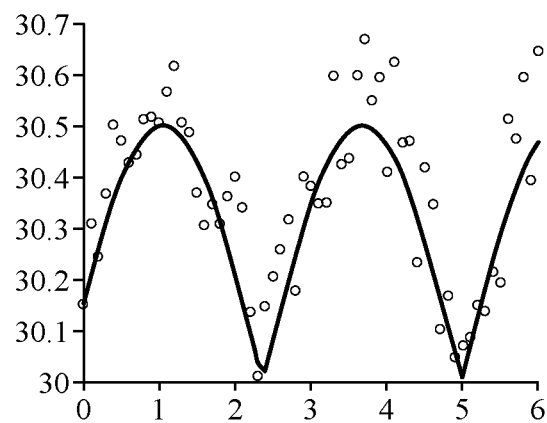
FIG. 6C　　　　　　　　FIG. 6D

IMAGE PROCESSING METHOD AND APPARATUS

CROSS-REFERENCE TO RELATED APPLICATIONS

This application is a continuation of U.S. patent application Ser. No. 16/860,385 filed on Apr. 28, 2020, which claims the benefit under 35 USC § 119(a) of Korean Patent Application No. 10-2019-0060985 filed on May 24, 2019 in the Korean Intellectual Property Office, the entire disclosure of which is incorporated herein by reference for all purposes.

BACKGROUND

Field

The following description relates to an image processing method and apparatus for estimating a light color of an alternating current (AC) light source using a high-speed camera.

Description of Related Art

According to statistics-based color constancy technology, a light is estimated using statistical characteristics of an image. For example, statistics based light estimation technology corrects a light by correcting a red, green, and blue (RGB) average of an input image to 1:1:1, assuming that the average RGB ratio of the image is achromatic. Since statistics-based research requires a low technical complexity and thus, provides a fast algorithm operation, a lot of research has been conducted, some examples of which are gray-world, gray-edge, shade of gray, and gray-pixel.

When the statistics-based technology is unsuitable for a corresponding statistical model despite its low complexity, the color performance is greatly distorted. In general, to perform light estimation accurately, various colors should exist complexly in an image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an image processing method, including receiving an image including frames captured over time in a light environment including an alternating current (AC) light, extracting AC pixels corresponding to the AC light from pixels in the image, estimating visual spaces of the AC pixels based on values of the AC pixels in the frames, estimating information of the AC light included in the image based on the visual spaces, and processing the image based on the information of the AC light.

The estimating of the visual spaces may include estimating visual spaces indicating illumination components and diffuse components of the AC pixels in the frames.

The estimating of the visual spaces may include estimating dichromatic planes of the AC pixels based on a dichromatic model.

The values of the AC pixels may include red component values, green component values, and blue components of the AC pixels, and the estimating of the visual spaces may include estimating the visual spaces based on a linear combination of the red component values, the green component values, and the blue component values of the AC pixels in the frames.

The estimating of the visual spaces may include extracting parameters of the visual spaces that minimize vertical distances between a plane and the values of the AC pixels in the frames.

The parameters may include extracting the parameters based on a least squares method.

The estimating of the information of the AC light may include estimating color information of the AC light.

The information of the AC light may include a ratio of red, green, and blue components of the AC light.

The processing of the image may include correcting a color of the image based on color information of the AC light.

The extracting of the AC pixels may include extracting the AC pixels, from among the pixels, exhibiting a signal distortion by noise that is less than a threshold.

The extracting of the AC pixels may include extracting the AC pixels based on variations of values of the pixels in the frames.

The extracting of the AC pixels may include modeling values of the pixels in the frames into a sinusoid, calculating respective differences between the pixel values of the modeled sinusoid and the values of the pixels in the frames, and extracting, as the AC pixels from the pixels, pixels having a sum of the calculated differences lesser than a threshold.

The modeling may include modeling the values of the pixels in the frames into the sinusoid based on a Gauss-Newton method.

The estimating of the information of the AC light may include determining light vector candidates corresponding to the AC light based on the visual spaces, determining a light vector from among the light vector candidates, based on prior information of the AC light, and estimating the information of the AC light based on the light vector.

The prior information may be obtained based on Planckian locus information.

The estimating of the information of the AC light may include estimating intersection lines of the visual spaces, determining an intersection line that minimizes a cost function, from among the intersection lines, based on a maximum a posteriori probability (MAP) estimation, and estimating the information of the AC light based on the determined intersection line.

The determining may include calculating probabilities of the intersection lines being perpendicular to the visual spaces, and determining an intersection line which minimizes a cost function, from among the intersection lines, based on prior information of the AC light and the probabilities.

In another general aspect, there is provided an image processing apparatus, including a processor configured to receive an image including a frames captured over time in a light environment including an alternating current (AC) light, to extract AC pixels corresponding to the AC light from a pixels in the image, to estimate visual spaces of the AC pixels based on values of the AC pixels included in the frames, to estimate information of the AC light included in the image based on the visual spaces, and to process the image based on the information of the AC light.

The processor may be configured to estimate visual spaces indicating illumination components and diffuse components of the AC pixels in the frames.

The processor may be configured to estimate dichromatic planes of the AC pixels based on a dichromatic model.

The values of the AC pixels may include red component values, green component values, and blue components of the AC pixels, and the processor may be configured to estimate the visual spaces based on a linear combination of the red component values, the green component values, and the blue component values of the AC pixels in the frames.

The processor may be configured to extract parameters of the visual spaces that minimize vertical distances between a plane and the values of the AC pixels in the frames.

The processor may be configured to estimate color information of the AC light.

The processor may be configured to correct a color of the image based on color information of the AC light.

The processor may be configured to extract, as the AC pixels, pixels showing a signal distortion by noise which is less than a threshold, from the pixels.

The processor may be configured to extract the AC pixels based on variations of values of the pixels included in the frames.

The processor may be configured to model values of the pixels in the frames into a sinusoid, to calculate respective differences between the pixel values of the modeled sinusoid and the values of the pixels in the frames, and to extract, as the AC pixels from the pixels, pixels having sum of the calculated differences lesser than a threshold.

The processor may be configured to model the values of the pixels included in the frames into the sinusoid based on a Gauss-Newton method.

The processor may be configured to determine light vector candidates corresponding to the AC light based on the visual spaces, to determine a light vector from among the light vector candidates, based on prior information of the AC light, and to estimate the information of the AC light based on the light vector.

The processor may be configured to estimate intersection lines of the visual spaces, to determine an intersection line that minimizes a cost function, from among the intersection lines, based on a maximum a posteriori probability (MAP) estimation, and to estimate the information of the AC light based on the determined intersection line.

The processor may be configured to calculate probabilities of the intersection lines being perpendicular to the visual spaces, and to determine an intersection line which minimizes a cost function, from among the intersection lines, based on prior information of the AC light and the probabilities.

Other features and aspects will be apparent from the following detailed description, the drawings, and the claims.

BRIEF DESCRIPTION OF THE DRAWINGS

FIGS. 6A through 6D illustrate examples of extracting AC pixels.

Figure 1:
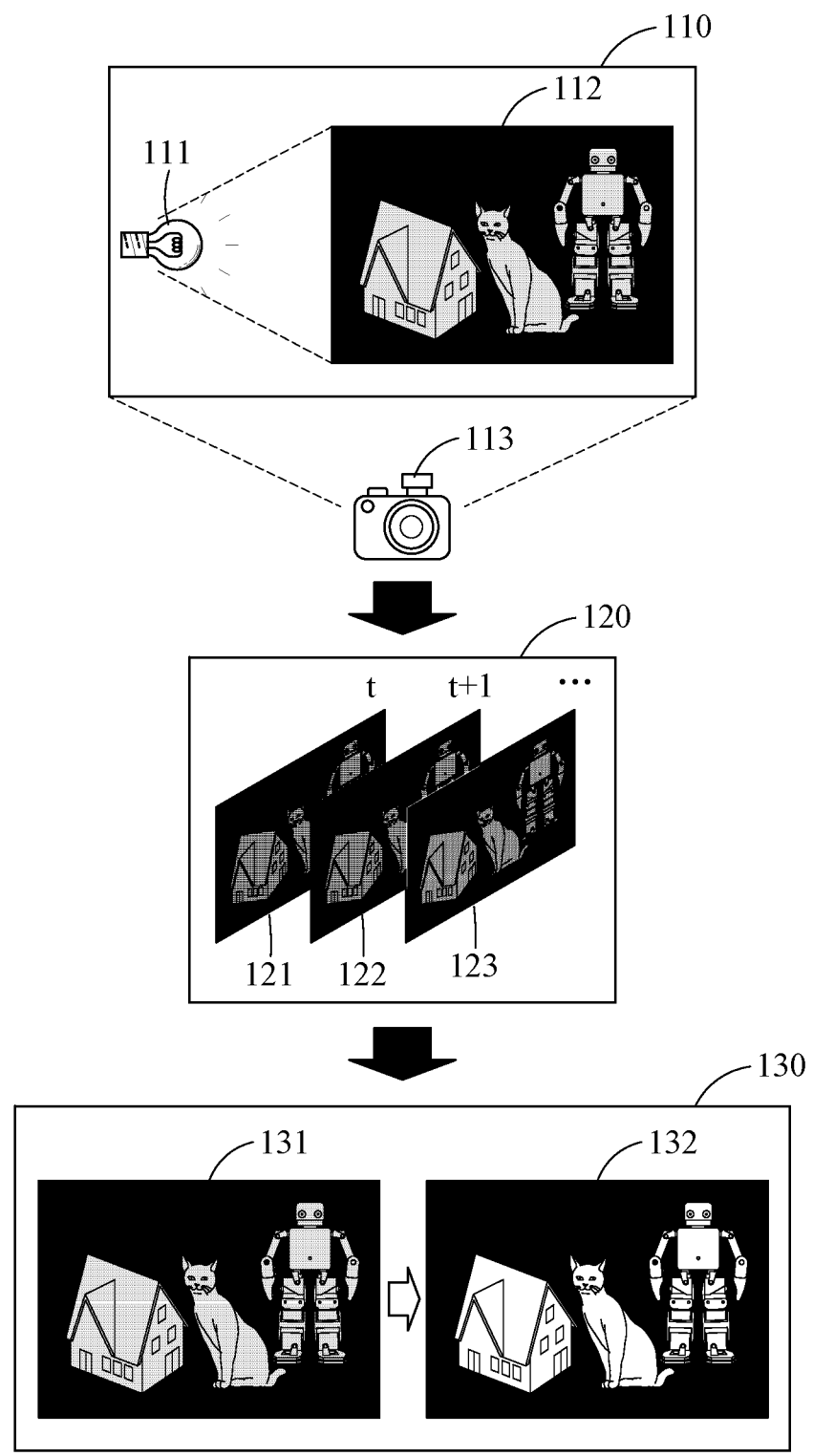
FIG. 1 illustrates an example of an image processing method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

In the description, if one component is "connected", "coupled", or "joined" to another component, a third component may be "connected", "coupled", and "joined" between the first and second components, although the first component may be connected, coupled, or joined to the second component. On the contrary, if it is described that one component is "directly connected", "directly coupled", or "directly joined" to another component, a third component may be absent. Likewise, expressions, for example, "between" and "immediately between" and "adjacent to" and "immediately adjacent to" may also be construed as described in the foregoing. As used herein, the term "and/or" includes any and all combinations of one or more of the associated listed items.

Words describing relative spatial relationships, such as "below", "beneath", "under", "lower", "bottom", "above", "over", "upper", "top", "left", and "right", may be used to conveniently describe spatial relationships of one device or elements with other devices or elements. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

Contents of the description regarding any one axial direction (x, y, or z axis) may also be applied in the same manner to any other axial direction. Such words are to be interpreted as encompassing a device oriented as illustrated in the drawings, and in other orientations in use or operation.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Hereinafter, the examples will be described in detail with reference to the accompanying drawings, wherein like drawing reference numerals are used for like elements.

FIG. 1 illustrates an example of an image processing method.

Referring to FIG. 1, in a light environment includes an alternating current (AC) light 111. In FIG. 1, a color of a light is estimated accurately based on a change in intensity of a pixel value which changes fast depending on a light based on capturing an image including a plurality of frames over time. By estimating the color of the light, the image quality for a color of an captured image 131 improves.

The AC light 111 refers to a beam whose an intensity changes periodically over time. In an example, the AC light 111 is a sinusoidal beam having a frequency of 60 hertz (Hz). The AC light 111 is generated by an AC light source. In an example, the light environment includes an environment including only an AC light, and a light environment in which a direct current (DC) light and an AC light are mixed.

An image processing method includes capturing operation 110, image analyzing operation 120, and image processing operation 130.

In capturing operation 110, an image including a plurality of frames is generated by capturing an object 112 over time in the light environment including the AC light 111. In an example, a camera 113 captures the object 112 at a capturing speed (frames per second (fps)) greater than or equal to the frequency (Hz) of the AC light. For example, when the AC light has a frequency of 60 Hz, the camera 113 captures the object 112 at a speed of 60 fps or higher.

In image analyzing operation 120, the image including the plurality of frames 121, 122, and 123 captured over time is analyzed in a temporal domain region. The image including the plurality of frames 121, 122, and 123 is generated in the light environment including the AC light 111 and thus, has image information which changes over time. For example, even pixels corresponding to the same position in the respective frames 121, 122, and 123 have different pixel values over time.

A pixel value includes intensity information of a pixel, and is also referred to as a pixel intensity. For example, the pixel value is a value between "0" and "255". A greater value indicates a brighter pixel. Further, the pixel value is expressed by a plurality of subpixel values. In an example, a pixel of a color image is expressed as red component pixel value, green component pixel value, blue component pixel value. In another example, a pixel of a color image is expressed in a form of a 3*1 matrix. In a case of a color image, various colors are created by combining a red component, a green component, and a blue component. For example, when the pixel value is expressed by a value between "0" and "255", 16777216 colors corresponding to $256^3$ colors are created.

In image analyzing operation 120, values of a plurality of pixels included in a plurality of frames are obtained, and information of an AC light is estimated using changes in the plurality of pixel values. In particular, in image analyzing operations 120, color information of the AC light is estimated. In an example, the color information of the AC light refers to a ratio of red, green, and blue of the color of the AC light.

In image processing operation 130, a corrected image 132 is generated by processing the existing image 131 based on the information of the AC light. For example, the image 132 in which a color of the existing image 131 is corrected is generated based on the color information of the AC light. The color-corrected image 132 is an image in which a color corresponding to the AC light is removed from the existing image 131.

Figure 2A:
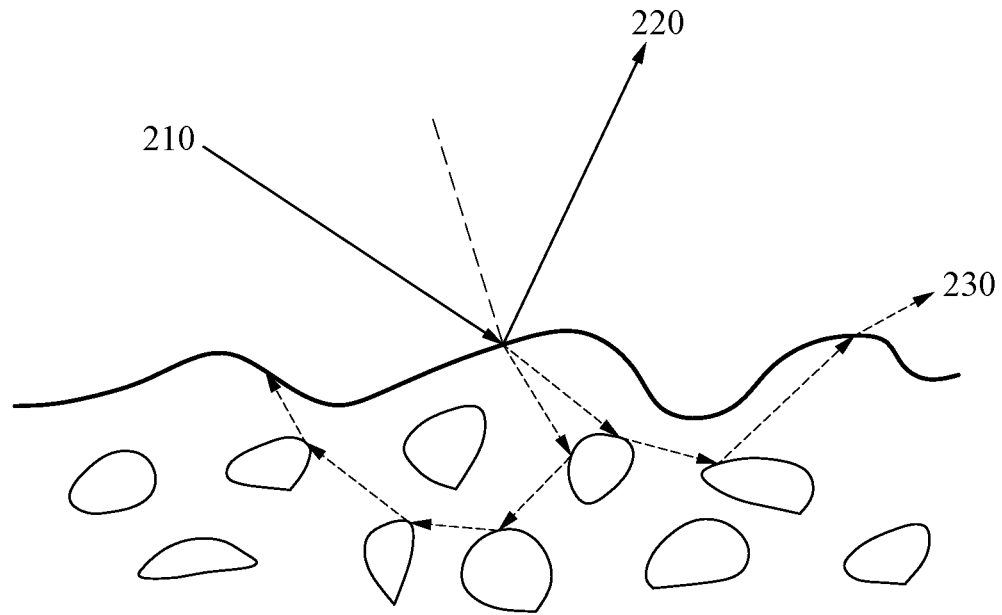
FIGS. 2A and 2B illustrate examples of reflected light.
Figure 2B:
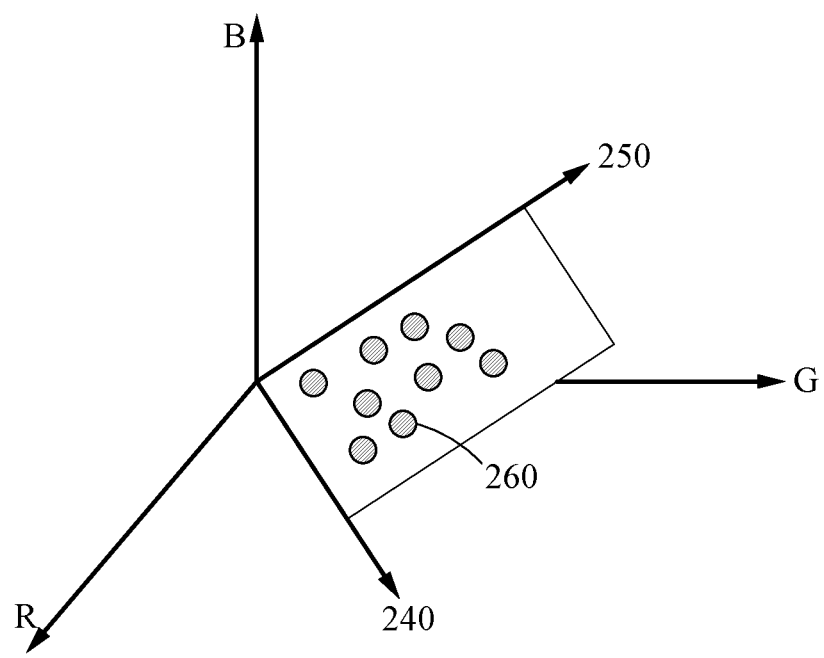

FIGS. 2A and 2B illustrate examples of reflected light. Referring to FIG. 2A, according to a dichromatic model, an incident beam 210 is divided into two reflection components 220 and 230. In an example, a reflected light from an object includes the specular reflection component 220 and the diffuse reflection component 230. The specular reflection component 220 is a reflection component reflected on the surface of the object. The diffuse reflection component 230 is a reflection component occurring when the beam is transmitted through the object and scattered.

The reflected light from the object includes a combination of the specular reflection component 220 and the diffuse reflection component 230. The reflected light from the object is expressed by a pixel value of an image, and the pixel value of the image is expressed by Equation 1.

$$I_c = m_d \Lambda_c + m_s \Gamma_c \quad [\text{Equation 1}]$$

In Equation 1, $\Lambda_c$ denotes a diffuse chromaticity, $\Gamma_c$ denotes a specular chromaticity, $m_d$ denotes a diffuse parameter, and $m_s$ denotes a specular parameter.

According to Equation 1, a pixel value of an image includes an illumination component and a diffuse component. The illumination component corresponds to the specular reflection component 220. A specular chromaticity of the specular reflection component 220 includes information related to a color of a light, and a specular parameter of the specular reflection component 220 includes information related to an intensity of the light. The diffuse component corresponds to the diffuse reflection component 230. A diffuse chromaticity of the diffuse reflection component 230 includes information related to a color of an object, and a diffuse parameter of the diffuse reflection component 230 includes information related to a brightness of the object. The specular chromaticity is also referred to as a light vector, and the diffuse chromaticity is also referred to as an object vector.

Referring to FIG. 2B, in an example, the diffuse chromaticity and the specular chromaticity are expressed in a form of vectors. For example, the diffuse chromaticity and the specular chromaticity are expressed by vectors of size 1, for example, in a form of (red component, green component, blue component) or $$\begin{bmatrix} \text{red component} \\ \text{green component} \\ \text{blue component} \end{bmatrix}.$$

Thus, a pixel value of an image determined by a combination of an illumination component 240 and a diffuse component 250 is also expressed in a form of (red component pixel value, green component pixel value, blue component pixel value) or $$\begin{bmatrix} \text{red component pixel value} \\ \text{green component pixel value} \\ \text{blue component pixel value} \end{bmatrix}$$

matrix.

For example, Equation 1 is expressed in a form of matrix, as given by Equation 2.

$$\begin{pmatrix} I_R \\ I_G \\ I_B \end{pmatrix} = \begin{pmatrix} \Lambda_R \Gamma_R \\ \Lambda_G \Gamma_G \\ \Lambda_B \Gamma_B \end{pmatrix} \begin{pmatrix} m_d \\ m_s \end{pmatrix} \qquad \text{[Equation 2]}$$

In an example, a unit vector of the illumination component 240 is the specular chromaticity, and a size of the illumination component 240 is the specular parameter. Further, a unit vector of the diffuse component 250 is the diffuse chromaticity, and a size of the diffuse component 250 is the diffuse parameter.

Further, values of pixels included in the image including the plurality of frames captured over time in the light environment including the AC light exist on a space 260 indicating the illumination component 240 and the diffuse component 250. The space 260 is referred to as a visual space or a dichromatic plane. The visual space will be described further below with reference to FIG. 3.

Some methods estimate a light by estimating a plane or a straight line principally using pixels at different positions in an image. In this example, to accurately estimate the plane or the straight line, pixels being at different positions in the image and having the same diffuse chromaticity and the same specular chromaticity need to be extracted. For this, the light is estimated by detecting a specular region and estimating the plane or the straight line using pixels in the detected region. However, when a specular region in the image is insufficient, the light estimation performance greatly decreases.

According to an example, rather than using pixels included in the specular region, a light is estimated by selecting AC pixels through modeling of a change in intensity of an AC light of the pixels to minimize an effect of noise on the image, and thus, the light is estimated more accurately.

Figure 3:
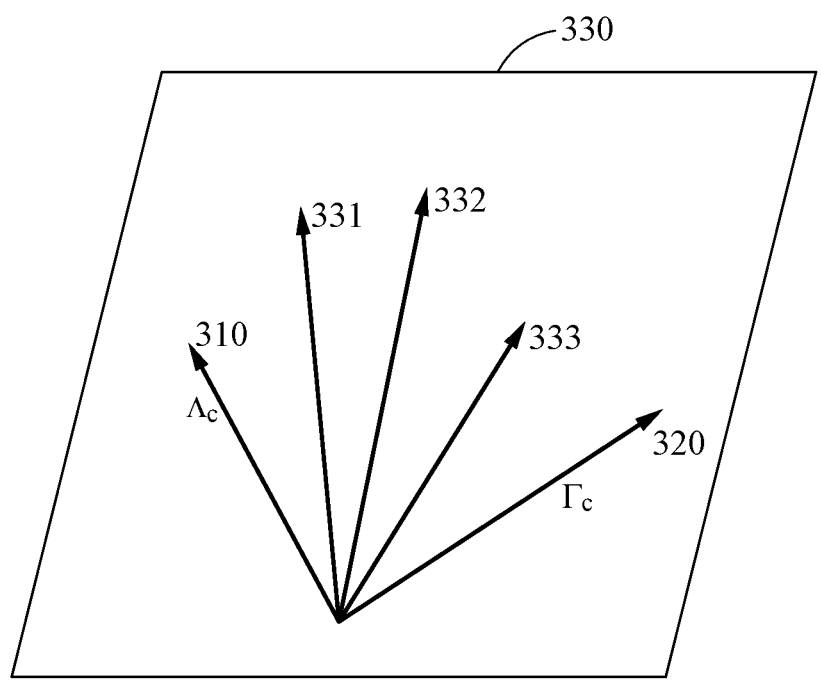
FIG. 3 illustrates an example of a visual space.

FIG. 3 illustrates an example of a visual space.

Referring to FIG. 3, values of pixels included in a plurality of frames exist on a visual space 330. The visual space 330 includes a space in which the values of the pixels included in the plurality of frames exist.

In an example, values of pixels included in an image including a plurality of frames captured over time in a light environment including an AC light are expressed in a temporal domain, as given by Equation 3.

$$I(t) = m_d(t)\Lambda + m_s(t)\Gamma \qquad \text{[Equation 3]}$$

Since a specular chromaticity 320 includes information related to a color of a light and a diffuse chromaticity 310 includes information related to a color of an object, the specular chromaticity 320 and the diffuse chromaticity 310 do not change over time. In addition, since a specular parameter and a diffuse parameter include information related to an intensity of a reflected light with respect to the AC light, the specular parameter and the diffuse parameter change over time. In detail, the specular parameter and the diffuse parameter are expressed by Equation 4.

$$m_s = \tilde{w}_s \Sigma G_i(t)$$

$$m_d = w_d \Sigma B_i(t)$$

$$B_c = \int_\Omega S_d(\lambda,x) E(\lambda) q_c(\lambda) d\lambda$$

$$G_c = \int_\Omega E(\lambda) q_c(\lambda) s\lambda \qquad \text{[Equation 4]}$$

In Equation 4, $E(\lambda)$ denotes a spectral energy distribution.

Since the specular chromaticity 320 and the diffuse chromaticity 310 do not change over time, the values of the pixels included in the plurality of frames exist on the visual space 330. For example, I(t) is the same as a vector 331, I(t+1) is the same as a vector 332, and I(t+2) is the same as a vector 333. As described above, the visual space 330 is determined if values of pixels included in two frames are provided with respect to pixels present at a position.

Figure 4A:
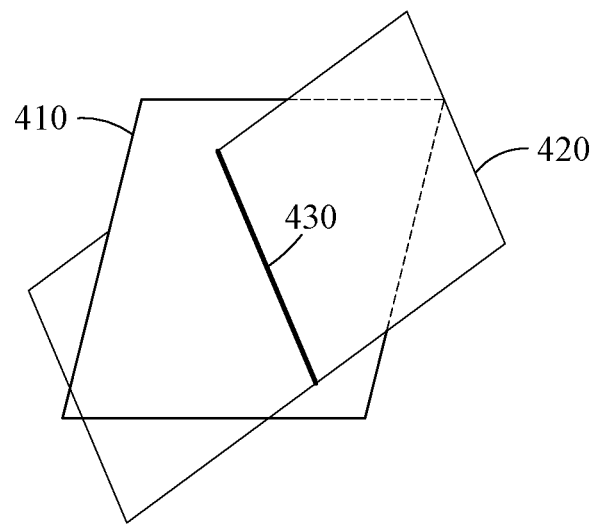
FIGS. 4A and 4B illustrate examples of estimating information of an alternating current (AC) light included in an image based on visual spaces.
Figure 4B:
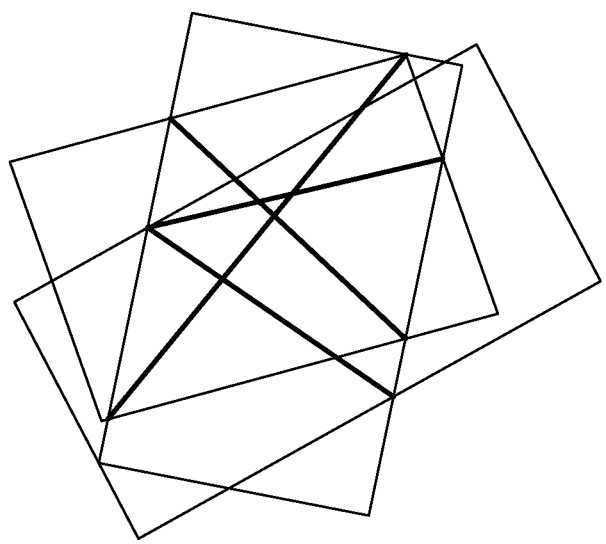

FIGS. 4A and 4B illustrate an example of estimating information of an AC light included in an image based on visual spaces.

Referring to FIG. 4A, a single visual space 410, 420 is determined for each pixel second pixel at the time t and a pixel value $I_2$(t+1) 612 of the second pixel at the time t+1.

In an example, shown in FIG. 4B, noise such as color noise causes a plurality of intersection lines. In an example, temporal spaces of N pixels have up to $_NC_2$ intersection lines. Thus, to more accurately estimate the specular chromaticity including the information related to the color of the light, additional constraints may be needed. The additional constraints will be described further below with reference to FIGS. 5 through 10.

Figure 5:
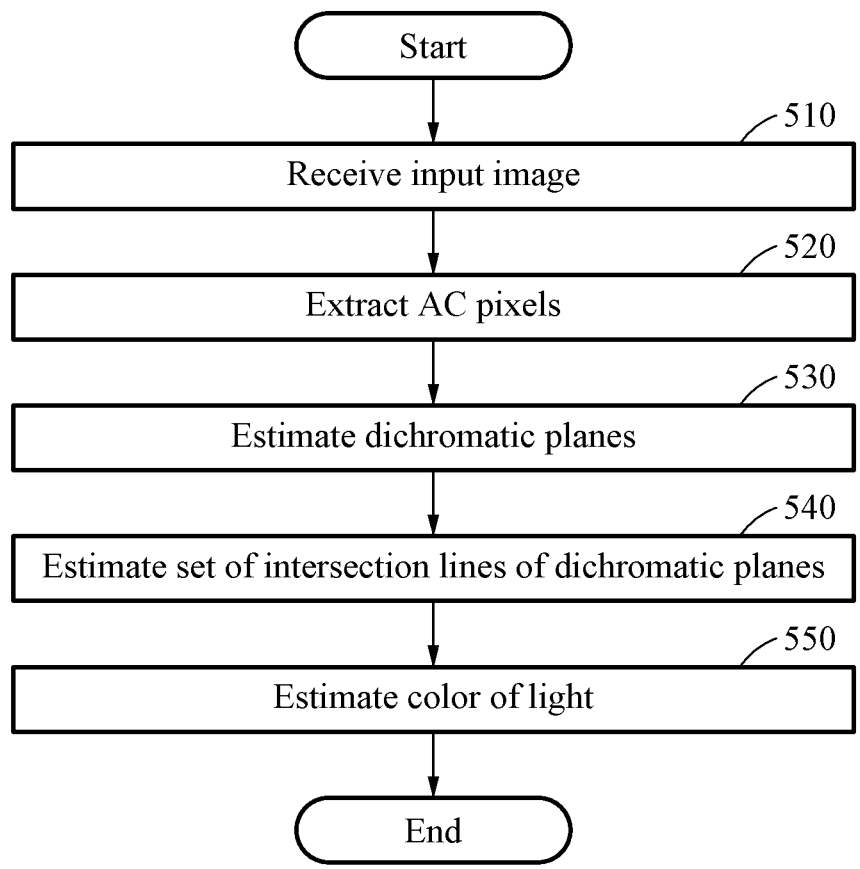
FIG. 5 illustrates an example of an image processing method.

FIG. 5 illustrates an example of an image processing method. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. The blocks of the image processing method of FIG. 5, and combinations of the blocks, are performed by an image processing apparatus. In an example, the image processing apparatus is implemented by special purpose hardware-based computer, and devices such as a processor, that perform the specified functions, or combinations of special purpose hardware and computer instructions included in the image processing apparatus. In addition to the description of FIG. 5 below, the descriptions of FIGS. 1-4 is also applicable to FIG. 5 and are incorporated herein by reference. Thus, the above description may not be repeated here.

In operation 510, the image processing apparatus receives an image including a plurality of frames captured over time in a light environment including an AC light.

In operation 520, the image processing apparatus extracts AC pixels corresponding to the AC light from a plurality of pixels included in the image. As described above with reference to FIGS. 4A and 4B, color noise makes it difficult to estimate accurate AC light information. Thus, pixels expected to have little noise are extracted as the AC pixels from the plurality of pixels included in the image. An example of extracting AC pixels will be described further below with reference to FIGS. 6A through 6D.

In operation 530, the image processing apparatus estimates visual spaces of the AC pixels based on values of the AC pixels included in the plurality of frames. For each AC pixel, a single visual space corresponding thereto is estimated. An example of estimating visual spaces will be described further below with reference to FIG. 7.

In operation 540, the image processing apparatus estimates information of the AC light included in the image based on the visual spaces. The information of the AC light includes color information of the AC light, and the color information of the AC light indicates a ratio of red, green, and blue of the color of the AC light. An example of estimating information of an AC light will be described further below with reference to FIGS. 8A through 8D and 9.

In operation 550, the image processing apparatus processes the image based on the information of the AC light. The image processing apparatus corrects a color of the image based on the color information of the AC light. For example, by removing a color corresponding to the AC light in an existing image, the image quality performance associated with a color of the existing image improves.

FIGS. 6A through 6D illustrate an example of extracting AC pixels.

In selecting an AC pixel by analyzing a change in intensity of a light, a pixel showing a least signal distortion by noise is selected to more accurately estimate a visual space.

FIG. 6A illustrates a pixel value $I_1(t)$ 601 of a first pixel at a time t and a pixel value $I_1(t+1)$ 602 of the first pixel at a time t+1, and FIG. 6B illustrates a pixel value $I_2(t)$ 611 of a second pixel at the time t and a pixel value $I_2(t+1)$ 612 of the second pixel at the time t+1.

When the pixel value changes relatively slightly over time as shown in FIG. 6A, an effect of noise is greater. A temporal space generated based on the pixel exhibits a relatively low accuracy. When the pixel value changes relatively greatly over time as shown in FIG. 6B, an effect of an AC change of a light is greater.

To obtain more accurate AC light information, pixels showing a little signal distortion by noise are extracted as AC pixels, and visual spaces and AC light information are estimated based on the extracted AC pixels.

Referring to FIGS. 6C and 6D, a change of a pixel value over time is modeled based on a change in intensity of an AC light. For example, when the change in intensity of the AC light is sinusoidal, the change of the pixel value is modeled using a sinusoid, as expressed by Equation 5.

$$y_i = f(x_i) = a\sin(F_s \cdot x_i + b) + c + n \qquad \text{[Equation 5]}$$

In Equation 5, F denotes an AC frequency, s denotes a frame rate of capturing, b denotes a phase, c denotes an offset value, and n denotes noise. Since the AC frequency of 60 hz and the frame rate of capturing are known, a frequency is predictable, and thus parameters to be estimated are an amplitude of the sinusoid, the phase, and the offset value.

In a similar manner, the change in the pixel value is also modeled as expressed by Equation 6.

$$y_i = f(x_i) = |a\sin(bx_i + c)| + d + n \qquad \text{[Equation 6]}$$

When the Gauss-Newton scheme is used, the parameters are accurately estimated in a short time through an iteration. For example, the change in the pixel value is modeled based on Equation 5 as shown in FIG. 6C, and is modeled based on Equation 6 as shown in FIG. 6D.

When the parameter estimation is completed, pixels are selected, as AC pixels, from the plurality of pixels if a difference between the modeled sinusoid and a real change in the pixel value is less than a threshold. In an example, with respect to the plurality of pixels, differences between the pixel values of the modeled sinusoid and values of pixels in respective frames are calculated. Pixels with a sum (AC fitting error) of the differences calculated for the respective frames, which is less than a threshold, are extracted as the AC pixels. The AC fitting error is expressed by Equation 7.

$$Err = \frac{1}{N\hat{a}}\sum_{i=1}^{N}(y - \hat{y})^2 - \qquad \text{[Equation 7]}$$

$$y = \frac{R^2 + G^2 + B^2}{3} -$$

$$\hat{y} = GaussNewton(y) -$$

$$\hat{y} = GaussNewton(y) \qquad \text{[Equation 7]}$$

To lower the algorithm complexity, sinusoid modeling is performed using a set stride, rather than all the pixels. For example, only 60 AC pixels are extracted from the plurality of pixels included in the image.

Figure 7:
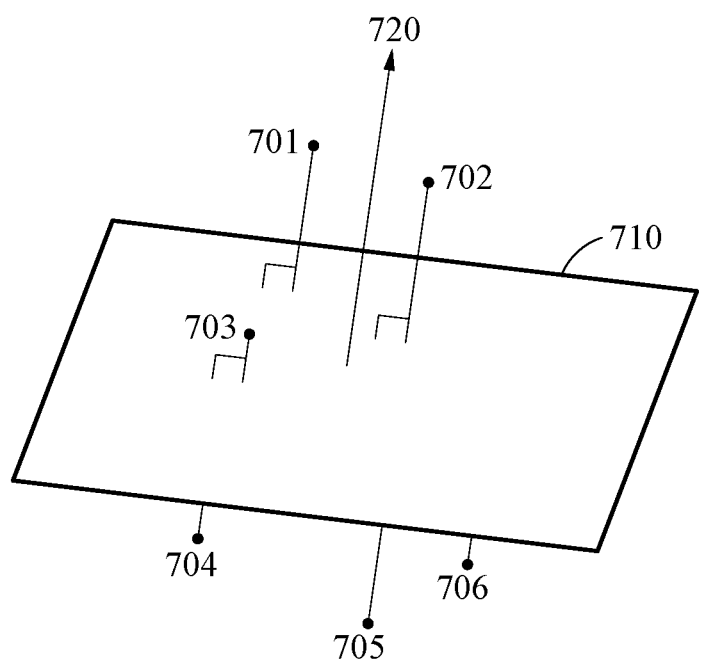
FIG. 7 illustrates an example of estimating a visual space.

FIG. 7 illustrates an example of estimating a visual space.

Referring to FIG. 7, in a visual space estimation operation, a light is estimated using temporal samples of AC pixels obtained in a previous operation. Visual spaces of the AC pixels are estimated based on values of the AC pixels included in a plurality of frames. With respect to the AC pixels, visual spaces indicating illumination components and diffuse components of the AC pixels included in the plurality of frames are estimated. The visual spaces are dichromatic planes of the AC pixels.

In an example, the parameters of a plane are three directional parameters of a normal vector of a three-dimensional plane, and are obtained using the least squares method. A plane minimizing an average vertical distance to the values of the AC pixels included in the plurality of frames is estimated based on vertical distances between the plane and the values of the AC pixels included in the plurality of frames.

For example, a normal vector 720 of a plane 710 minimizes an average vertical distance to a pixel value 701 at a first point in time, a pixel value 702 at a second point in time, a pixel value 703 at a third point in time, a pixel value 704 at a fourth point in time, a pixel value 705 at a fifth point in time, and a pixel value 706 at a sixth point in time, using the least squares method.

FIGS. 8A through 8D and 9 illustrate examples of estimating information of an AC light.

Figure 8A:
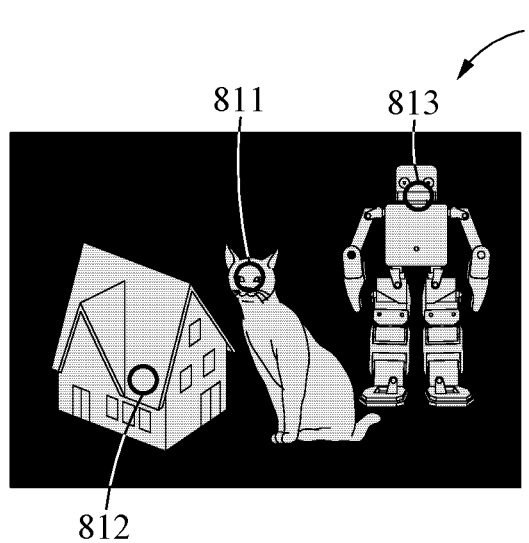
FIGS. 8A through 8D and 9 illustrate examples of estimating information of an AC light.
Figure 8B:
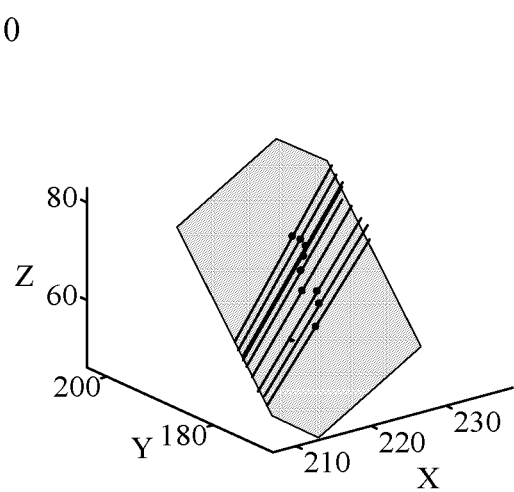
Figure 8C:
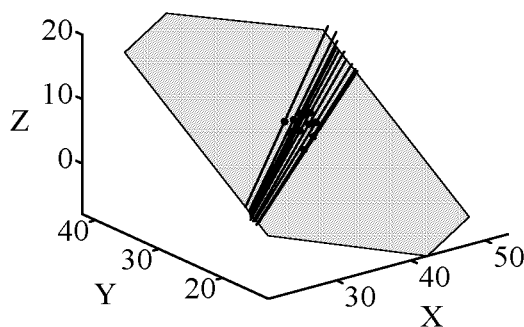
Figure 8D:
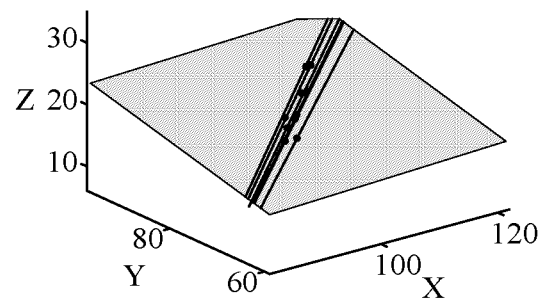

Referring to FIG. 8A, three AC pixels 811, 812, and 813 are extracted from an image 810. FIG. 8B illustrates a visual space corresponding to a first pixel 811, FIG. 8C illustrates a visual space corresponding to a second pixel 812, and FIG. 8D illustrates a visual space corresponding to a third pixel 813.

Intersection lines of the visual space of the first pixel 811, the visual space of the second pixel 812, and the visual space of the third pixel 813 indicate specular chromaticities including information related to a color of the light. The specular chromaticities include color information of an AC light, and the color information of the AC light indicates a ratio of red, green, and blue of the color of the AC light.

Light vector candidates corresponding to the AC light are determined based on the visual spaces. A light vector is determined among the light vector candidates, based on prior information of the AC light. The information of the AC light is estimated based on the light vector.

In an example, an intersection line of visual spaces should correspond to a single light vector since all the visual spaces share the same light vector. However, in reality, there are a number of intersection lines due to noise in a video and camera characteristics. To estimate an optimal light vector among the intersection lines, in an example, a maximum a posteriori probability (MAP) estimation is used.

The intersection lines of the visual spaces are estimated. In an example, an intersection line which minimizes a cost function is determined among the intersection lines based on an MAP estimation. The information of the AC light is estimated based on the determined intersection line.

The MAP estimation is a method for detecting an optimal parameter by combining a provided observation result and "prior knowledge (prior probability)". The MAP estimation is expressed by Equation 8.

$$\begin{aligned} \hat{\Gamma} &= \mathrm{argmax}_{\Gamma} p(\Gamma|P) \\ &= \mathrm{argmax} \prod_k p(\Gamma|P_k) \\ &= \mathrm{argmax}_{\Gamma} \prod_k p(P_k|\Gamma_i)p(\Gamma_i) \\ &= \mathrm{argmax}_{\Gamma_i} \sum_k \ln p(P_k|\Gamma_i) + n\ln p(\Gamma_i) \\ &= \mathrm{argmin}_{\Gamma_i} \sum_k \left|\arccos\left(\frac{p_k^\pm \cdot \Gamma_i}{\|p_k^\pm\|\|\Gamma_i\|}\right)\right|^2 + \\ &\quad \lambda |d_{plankcian}|^2 \end{aligned}$$

Referring to Equation 8, the MAP estimation includes two terms, in detail, a physics term indicating physical properties and a statistical term indicating statistical properties.

The physics term indicates a physical relationship between an AC light and a visual space. In an example, a vector of a light should be perpendicular to normal vectors of all visual spaces. Thus, an angle using inner products of the light vector and the normal vectors of the visual spaces is calculated and used. In an example, when the angle is close to 90 degrees, the intersection line is determined to be of a more accurate light. When a cosine value obtained using a cosine function is close to "0", that is, when the value is small, the intersection line is estimated to be of a more accurate light. The foregoing is expressed by Equation 9.

$$p(P_k|\Gamma) = \frac{1}{\sqrt{2\pi\sigma^2}} \exp\left(-\frac{1}{2\sigma^2}\left|\cos\left(\frac{p_k^\pm \cdot \Gamma_i}{\|p_k^\pm\|\|\Gamma_i\|}\right)\right|^2\right) \qquad \text{[Equation 9]}$$

Figure 9:
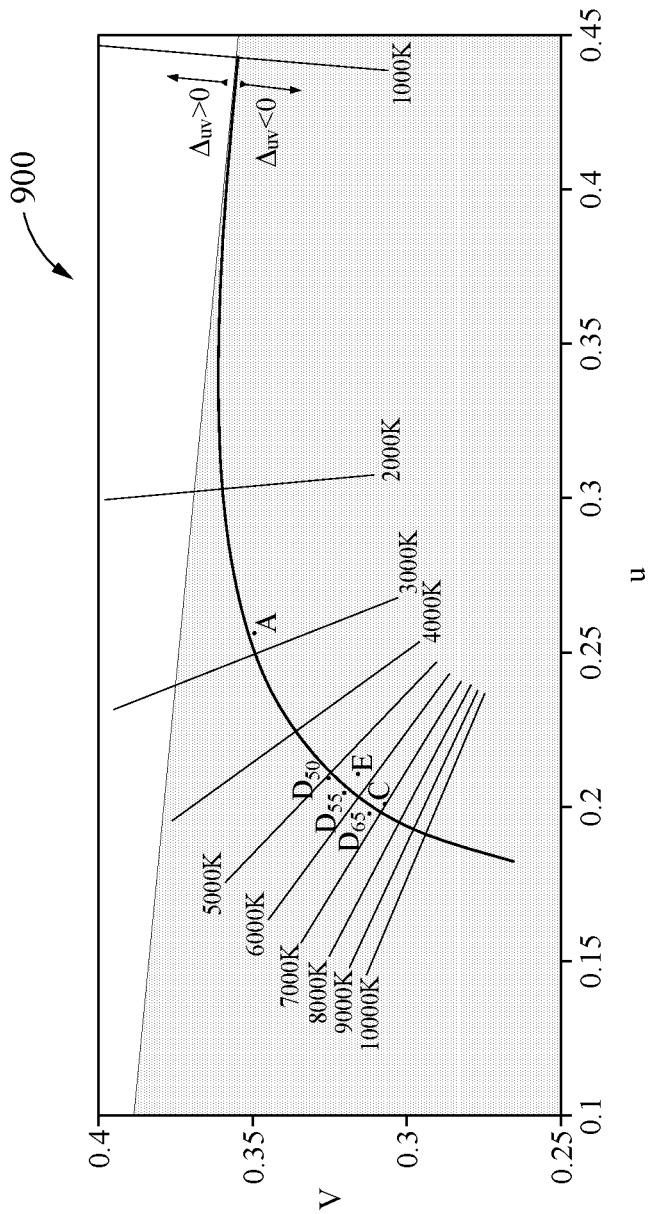

The statistical term uses a Planckian locus of FIG. 9 as the prior information. The Planckian locus indicates changes in colors of a black body with respect to temperature. These colors include colors of a majority of light sources that may exist in nature. In an example, on an ultraviolet (UV) domain, an intersection line at a short vertical distance from the Planckian locus is estimated to be of an accurate light.

An intersection line minimizing a sum of values of the physics term and the statistical term is detected, and the intersection line is estimated as a light vector.

Figure 10:
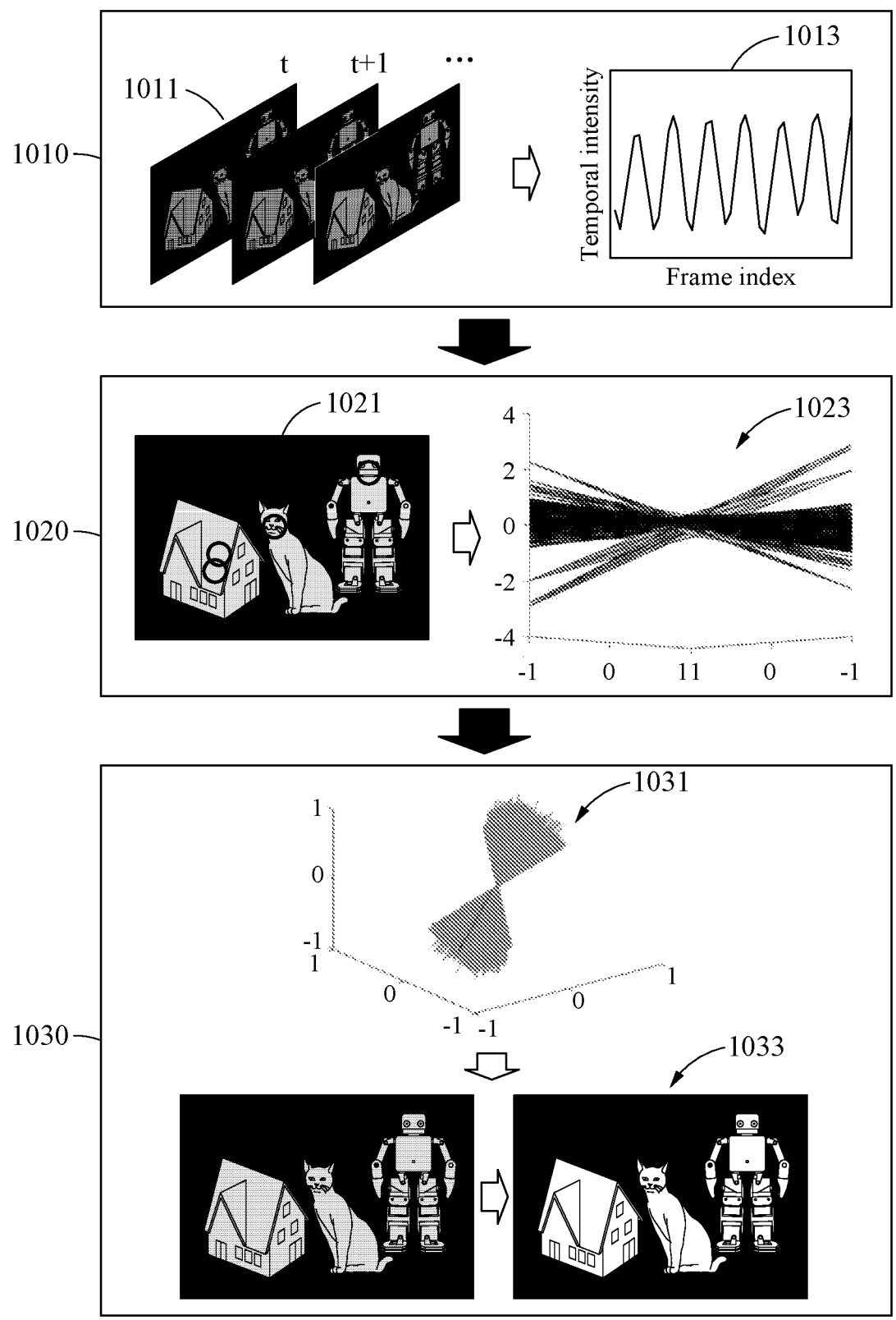
FIG. 10 illustrates an example of an image processing method.

FIG. 10 illustrates an example of an image processing method.

Referring to FIG. 10, an image processing method includes operation 1010 of extracting AC pixels corresponding to an AC light from a plurality of pixels included in an image, operation 1020 of estimating visual spaces of the AC pixels based on values of the AC pixels included in the plurality of frames, and operation 1030 of estimating information of the AC light included in the image based on the visual spaces, and processing the image based on the information of the AC light.

In operation 1010, AC pixels are extracted from a plurality of pixels included in an image 1011 including a plurality of frames captured over time in a light environment including an AC light. In an example, pixels with a sum of differences between pixel values of a modeled sinusoid 1013 and pixel values of the frames, which is less than a threshold, are extracted as the AC pixels.

In operation 1020, visual spaces 1030 are estimated based on pixel values of extracted AC pixels 1021 over time.

In operation 1030, a set 1031 of intersection lines of the visual spaces of the AC pixels is extracted. A single intersection line is extracted from the intersection lines based on an MAP estimation. The extracted intersection line includes color information of the AC light, and correction 1030 of a color of the image is performed based on the color information of the AC light.

Figure 11:
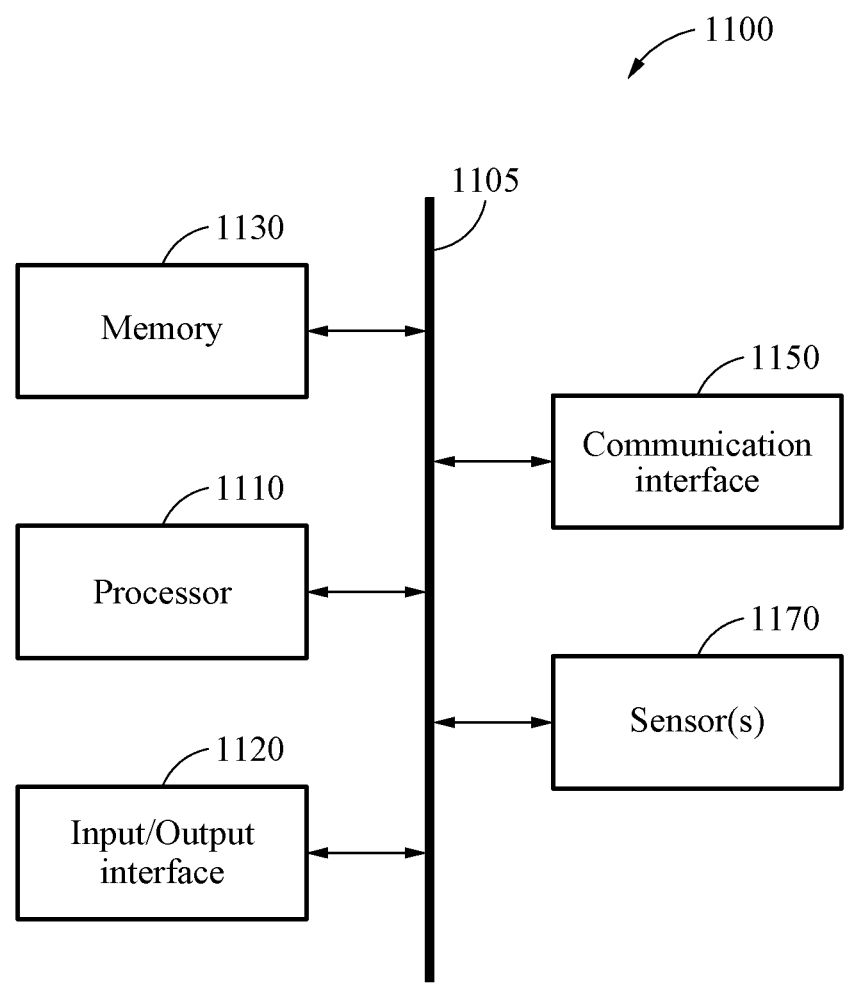
FIG. 11 illustrates an example of an image processing apparatus.

FIG. 11 illustrates an example of an image processing apparatus.

Referring to FIG. 11, an image processing apparatus 1100 includes a processor 1110. The image processing apparatus 1100 further includes, an input/output interface 1120, a memory 1130, a communication interface 1150, and sensor(s) 1170. The processor 1110, the memory 1130, the communication interface 1150, and the sensor(s) 1170 communicate with each other through a communication bus 1105.

The processor 1110 is, for example, an apparatus configured to execute instructions or programs, or to control the image processing apparatus 1100. The processor 1110 includes, for example, a central processing unit (CPU), a processor core, a multi-core processor, a reconfigurable processor, a multicore processor, a multiprocessor, an application-specific integrated circuit (ASIC), and a field programmable gate array (FPGA), a graphics processing unit (GPU), or any other type of multi- or single-processor configuration. Further details regarding the processor 1110 is provided below.

The processor 1110 receives an image including a plurality of frames captured over time in a light environment including an AC light, extracts AC pixels corresponding to the AC light from a plurality of pixels included in the image, estimates visual spaces of the AC pixels based on values of the AC pixels included in the plurality of frames, estimates information of the AC light included in the image based on the visual spaces, and processes the image based on the information of the AC light.

The memory 1130 includes an enrollment database including the image and the pixel values. The memory 1130 is a volatile memory or a non-volatile memory. The memory 1130 includes a large capacity storage medium such as a hard disk to store the variety of data. Further details regarding the memory 1130 is provided below.

The sensor(s) 1170 include, for example, a camera configured to capture an image at a capturing speed (fps) greater than or equal to a frequency (Hz) of the AC light. The sensor(s) 1170 collect a variety of image information.

In an example, the input/output interface 1120 may be a display that receives an input from a user or provides an output of the image processing apparatus 1100. In an example, the input/output interface 930 may function as an input device and receives an input from a user through a traditional input method, for example, a keyboard and a mouse, and a new input method, for example, a touch input, a voice input, and an image input. Thus, the input/output interface 1120 may include, for example, a keyboard, a mouse, a touchscreen, a microphone, and other devices that may detect an input from a user and transmit the detected input to the image processing apparatus 1100.

In an example, the input/output interface 1120 may function as an output device, and provide an output of the processed image based on the information of the AC light to a user. The input/output interface 1120 may include, for example, a display, a touchscreen, and other devices that may provide an output to a user. However, the input/output interface 1120 are not limited to the example described above, and any other displays, such as, for example, computer monitor and eye glass display (EGD) that are operatively connected to the image processing apparatus 1100 may be used without departing from the spirit and scope of the illustrative examples described. In an example, the input/output interface 1120 is a physical structure that includes one or more hardware components that provide the ability to render a user interface, render a display, and/or receive user input.

In an example. the image processing apparatus 1100 is connected to an external device (for example, a microphone, a keyboard, or an image sensor) via the communication interface 1150, and exchanges data.

In an example, the processor 1110 estimates visual spaces indicating illumination components and diffuse components of the AC pixels included in the plurality of frames. In an example, the processor 1110 estimates dichromatic planes of the AC pixels based on a dichromatic model. In an example, the processor 1110 estimates the visual spaces to be produced through a linear combination of red component values, green component values, and blue component values of the AC pixels included in the plurality of frames. In an example, the processor 1110 estimates parameters of the visual spaces which minimize vertical distances between a plane and the values of the AC pixels included in the plurality of frames. In an example, the processor 1110 estimates color information of the AC light. In an example, the processor 1110 corrects a color of the image based on color information of the AC light. In an example, the processor 1110 extracts the AC pixels based on variations of values of the plurality of pixels included in the plurality of frames. In an example, the processor 1110 models values of the plurality of pixels included in the plurality of frames into a sinusoid, calculates differences between the pixel values of the modeled sinusoid and values of pixels in the frames, with respect to the plurality of pixels, and extracts, as the AC pixels, pixels with a sum of the calculated differences which is less than a threshold, from the plurality of pixels. In an example, the processor 1110 models the values of the pixels included in the plurality of frames into a sinusoid based on the Gauss-Newton method. In an example, the processor 1110 determines light vector candidates corresponding to the AC light based on the visual spaces, determines a light vector among the light vector candidates, based on prior information of the AC light, and estimates the information of the AC light based on the light vector. In an example, the processor 1110 estimates intersection lines of the visual spaces, determines an intersection line which minimizes a cost function, among the intersection lines, based on an MAP estimation, and estimates the information of the AC light based on the determined intersection line. In an example, the processor 1110 calculates probabilities of the intersection lines being perpendicular to the visual spaces, and determines an intersection line which minimizes a cost function, among the intersection lines, based on prior information of the AC light and the probabilities.

In addition, the processor 1110 performs one or more methods described with reference to FIGS. 2A through 7 or an algorithm corresponding to the at least one method. The processor 1110 executes a program and controls the image processing apparatus 1100. Program codes executed by the processor 1110 are stored in the memory 1130.

The image processing apparatus 1100 is mounted on various devices and/or systems such as, for example, a smart phone, a mobile phone, a wearable device, (such as, a ring, a watch, a pair of glasses, glasses-type device, a bracelet, an ankle bracket, a belt, a necklace, an earring, a headband, a helmet, a device embedded in the cloths, or an eye glass display (EGD)), a computing device, for example, a server, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), an ultra mobile personal computer (UMPC), a portable lab-top PC, electronic product, for example, a robot, a digital camera, a digital video camera, a portable game console, an MP3 player, a portable/personal multimedia player (PMP), a handheld e-book, a global positioning system (GPS) navigation, a personal navigation device, portable navigation device (PND), a handheld game console, an e-book, a television (TV), a high definition television (HDTV), a smart TV, a smart appliance, a smart home device, or a security device for gate control, a smart speaker, a robot, various Internet of Things (loT) devices, or a kiosk and may be performed by an application, middleware, or an operating system installed on a user device, or a program of a server interoperating with the corresponding application.

The image processing apparatus 1100, and other apparatuses, units, modules, devices, and other components described herein with respect to FIGS. 1-11 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the image processing method. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image processing method, comprising:
receiving an image including frames captured over time in a light environment including an alternating current (AC) light;
estimating visual spaces of AC pixels in the image determined based on illumination components and diffuse components of the AC pixels;
estimating an intersection line, the intersection line indicating the illumination components of the visual spaces;
estimating information of the AC light included in the image based on the intersection line; and
processing the image based on the information of the AC light.

2. The image processing method of claim 1, further comprising extracting the AC pixels corresponding to the AC light from pixels in the image.

3. The image processing method of claim 1, wherein the estimating of the visual spaces comprises estimating dichromatic planes of the AC pixels based on a dichromatic model.

4. The image processing method of claim 1, wherein values of the AC pixels comprise red component values, green component values, and blue components of the AC pixels, and
the estimating of the visual spaces comprises estimating the visual spaces based on a linear combination of the red component values, the green component values, and the blue component values of the AC pixels.

5. The image processing method of claim 1, wherein the estimating of the visual spaces comprises extracting parameters of the visual spaces that minimize vertical distances between a plane and values of the AC pixels in the frames.

6. The image processing method of claim 5, wherein the extracting of the parameters is based on a least squares method.

7. The image processing method of claim 1, wherein the estimating of the information of the AC light comprises estimating color information of the AC light.

8. The image processing method of claim 1, wherein the information of the AC light comprises a ratio of red, green, and blue components of the AC light.

9. The image processing method of claim 1, wherein the processing of the image comprises correcting a color of the image based on color information of the AC light.

10. The image processing method of claim 2, wherein the extracting of the AC pixels comprises extracting the AC pixels, from among the AC pixels, exhibiting a signal distortion by noise that is less than a threshold.

11. The image processing method of claim 2, wherein the AC pixels are extracted based on variations of values of pixels in the frames.

12. The image processing method of claim 2, wherein the extracting of the AC pixels comprises:
modeling values of pixels in the frames into a sinusoid;
calculating respective differences between pixel values of the modeled sinusoid and values of the pixels in the frames; and
extracting, as the AC pixels, from among the pixels, pixels having a sum of the calculated differences lesser than a threshold.

13. The image processing method of claim 12, wherein the modeling comprises modeling the values of the pixels in the frames into the sinusoid based on a Gauss-Newton method.

14. The image processing method of claim 1, wherein the estimating of the information of the AC light comprises:
determining light vector candidates corresponding to the AC light based on the visual spaces;
determining a light vector from among the light vector candidates, based on prior information of the AC light; and
estimating the information of the AC light based on the determined light vector.

15. The image processing method of claim 14, wherein the prior information is obtained based on Planckian locus information.

16. The image processing method of claim 1, further comprising determining an intersection line that minimizes a cost function, from among the intersection lines.

17. The image processing method of claim 16, wherein the determining of the intersection line comprises:
determining the intersection line based on a maximum a posteriori probability (MAP) estimation.

18. The image processing method of claim 17, wherein the determining of the intersection line comprises:
calculating probabilities of the intersection lines being perpendicular to the visual spaces; and
determining an intersection line which minimizes a cost function, from among the intersection lines, based on prior information of the AC light and the probabilities.

19. A non-transitory computer-readable storage medium storing instructions that, when executed by a processor, cause the processor to perform the image processing method of claim 1.

20. An image processing apparatus, comprising:
a processor configured to: receive an image including frames captured over time in a light environment including an alternating current (AC) light, estimate visual spaces of AC pixels in the image, estimate an intersection line of the visual spaces, estimate information of the AC light included in the image based on the intersection line, and process the image based on the information of the AC light.

21. The image processing apparatus of claim 20, wherein the processor is further configured to extract the AC pixels corresponding to the AC light from among pixels in the image.

22. The image processing apparatus of claim 20, wherein the processor is further configured to estimate dichromatic planes of the AC pixels based on a dichromatic model.

23. The image processing apparatus of claim 20, wherein values of the AC pixels in the image comprise red component values, green component values, and blue component values, and wherein
the processor is further configured to estimate the visual spaces based on a linear combination of the red component values, the green component values, and the blue component values.

24. The image processing apparatus of claim 20, wherein the processor is further configured to extract parameters of the visual spaces that minimize vertical distances between a plane and values of the AC pixels.

25. The image processing apparatus of claim 20, wherein the processor is further configured to estimate color information of the AC light.

26. The image processing apparatus of claim 20, wherein the processor is further configured to correct a color of the image based on color information of the AC light.

27. The image processing apparatus of claim 20, wherein the processor is further configured to extract, as the AC pixels, from among the pixels of the image, pixels having a signal distortion which is less than a threshold.

28. The image processing apparatus of claim 20, wherein the processor is further configured to extract the AC pixels based on variations of values of pixels in the frames.

29. The image processing apparatus of claim 20, wherein the processor is further configured to: model values of pixels in the frames into a sinusoid, calculate respective differences between the pixel values of the modeled sinusoid and values of the pixels in the frames, and to extract, as the AC pixels, from among the pixels, pixels having sums of the calculated differences lesser than a threshold.

30. The image processing apparatus of claim 29, wherein the processor is further configured to model the values of the pixels into the sinusoid based on a Gauss-Newton method.

31. The image processing apparatus of claim 20, wherein the processor is further configured to: determine light vector candidates corresponding to the AC light based on the visual spaces, determine a light vector from among the light vector candidates based on prior information of the AC light, and estimate the information of the AC light based on the determined light vector.

32. The image processing apparatus of claim 20, wherein the processor is further configured to determine, from among the intersection lines, the intersection line as a line that minimizes a cost function.

33. The image processing apparatus of claim 32, wherein the processor is further configured to determine the intersection line based on a maximum a posteriori probability (MAP) estimation.

34. The image processing apparatus of claim 33, wherein the processor is further configured to calculate probabilities of the intersection lines being perpendicular to the visual spaces, and to determine, from among the intersection lines, the intersection line as a line which minimizes a cost function, based on prior information of the AC light and based on the probabilities.

* * * * *